United States Patent [19]
Vahaviolos

[11] 3,924,456
[45] Dec. 9, 1975

[54] METHODS AND APPARATUS FOR DETECTING THE PRESENCE OF CRACKS IN A WORKPIECE BY THE USE OF STRESS WAVES EMITTED THEREFROM

[75] Inventor: Sotirios John Vahaviolos, Cranbury, N.J.

[73] Assignee: Western Electric Company, Inc., New York, N.Y.

[22] Filed: Aug. 17, 1973

[21] Appl. No.: 389,414

[52] U.S. Cl.................. 73/88 R; 73/88.5 R; 73/67
[51] Int. Cl..................... G01n 3/100; G01n 29/100
[58] Field of Search......... 73/88.5 R, 88.5 SD, 71.2, 73/71.4, 67; 330/107, 110

[56] References Cited
UNITED STATES PATENTS

| | | | |
|---|---|---|---|
| 3,268,830 | 8/1966 | Ragsdale | 330/110 |
| 3,521,166 | 7/1970 | Grayzel | 73/67 |
| 3,541,462 | 11/1970 | Sarkisian et al. | 330/110 |
| 3,569,603 | 3/1971 | Kern | 330/107 |
| 3,713,127 | 1/1973 | Keledy et al. | 73/67 |

OTHER PUBLICATIONS
R. E. Herzog, Forecasting Failures with Acoustic-Emission, June 14, 1973, 132–137 (*Machine Design*).
Romrell et al., Monitoring of Crack Growth in Ceramic by Acoustic Emission, Dec., 1970, 267–271 (*Mat. Eval.*). Dunegan et al., Acoustic Emission, May, 1971, 20–24 (*Research/Development*).

Primary Examiner—James J. Gill
Assistant Examiner—Anthony V. Ciarlante
Attorney, Agent, or Firm—E. W. Pfeifle;

[57] ABSTRACT

Microcracks in ceramic substrates are detected by positioning a piezoelectric transducer proximate a supporting base for the substrate. The stress waves which are emitted by the cracks which form in the substrate when it is subjected to a load are converted into electrical pulses by the transducer. Because ceramic is a brittle material rather than ductile these pulses are of low amplitude, short duration, and fast rise time. Special electronic circuitry is disclosed to detect these pulses and to distinguish them from the background noise.

15 Claims, 8 Drawing Figures

METHODS AND APPARATUS FOR DETECTING THE PRESENCE OF CRACKS IN A WORKPIECE BY THE USE OF STRESS WAVES EMITTED THEREFROM

BACKGROUND OF THE INVENTION

1. Field of the Invention

The present invention relates to methods and apparatus for detecting defects such as cracks in a workpiece. More particularly, the present invention relates to methods and apparatus for detecting cracks in a workpiece by detecting and measuring the high frequency signals which are generated by stress waves propagating from the cracks, said signals comprising pulses which are characterized by low amplitude, short duration and fast rise time.

2. Description of the Prior Art

The detection of cracks or flaws in manufactured articles has always been of interest to industry. Where the workpiece is comprised of a ductile material, some prior art techniques have relied on the detection of stress waves which are emitted from the cracks or flaws in the workpiece when it is subjected to stress. However, the increasing use of brittle materials, such as glass, ceramics and alumina has made the detection of cracks in brittle materials of equal importance. Also, because of the nature of the uses to which such workpieces are put, it has become increasingly important to detect microcracks, as well as conventional cracks, in these materials.

U.S. Pat. No. 3,545,262, which issued on Dec. 8, 1970 to R. K. Steele et al., discloses methods and apparatus for detecting and locating flaws in a pressure vessel manufactured from ductile material while the vessel is subjected to a load. The apparatus disclosed in the above-referenced patent comprises a plurality of stress wave sensors mounted directly to an external surface of the vessel; an amplifier connected to each sensor; and a system for processing the amplified waves to both indicate the location of the flaw, by a triangulation technique, and to provide information which indicates the impending destruction of the vessel.

In a report dated May 19, 1972, entitled "Investigation of Acoustic Emission from Ceramic-Materials," by G. A. Alers, No. SC513.6FR, published by North American Rockwell Science Center, a system is disclosed for detecting catastrophic failures (i.e., visible cracks) in either ductile or brittle materials by means of the acoustic waves which are emitted from the failure. The system comprises a high frequency transducer mounted on the material being tested to detect the acoustic waves emitted from the failure; a wideband amplifier for amplifying the detected acoustic wave; a processing system comprising a fast, broadband recording system (e.g., a modified video-tape recorder) to record the amplified acoustic wave; and circuitry for subsequently analyzing the recorded signals.

The system disclosed in the Alers report, however, is indicated as only being capable of detecting catastrophic failures, i.e., failures where a large signal is generated and the crack is visible to the human eye.

U.S. Pat. No. 3,713,127 issued to F. C. Keledy et al. on Jan. 23, 1973 discloses a crack detecting and monitoring system for providing a real-time indication of crack growth in a material. The system comprises a piezoelectric transducer mechanically attached to the structure being monitored, a pre-amplifier connected to the transducer, a filter for filtering out normal vibration and acoustic noise, and a level detector where the amplified and filtered signal is compared against a preset level above the noise level at that stage. Means are also provided to distinguish between crack energy acoustic signals and acoustic signals resulting from mechanical impact on the structure being monitored. The patented system, in the peak detection section, only serves to detect the envelope of the amplified and filtered signal using an electrolytic capacitor. The patented system, therefore, would not react sufficiently fast to track peak voltages in signals characterized by very short duration and very fast rise times. Furthermore, very low amplitude signals resulting from microcracks in brittle materials might be undetectable in the noise generated within the patented system.

The problem which remains unsolved by the prior art is the provision of relatively inexpensive, non-contact methods and apparatus for detecting stress waves emitted from cracks in ductile or brittle materials, while the material is subjected to a load. Such cracks may, of course, include microcracks; and, in the prior art, such microcracks can only be detected by viewing the brittle material under a microscope.

The solution to the foregoing problem is based upon the discovery that stress waves propagating from microcracks in brittle materials comprise signals having a very low amplitude, short duration, and fast rise time, which signals were hidden in prior art detection systems by the inherent noise generated by the system, as well as by noise which may be generated by other components located in proximity to the system. As will be more fully explained herebelow, the instant invention allows such signals to be detected and accurately measured by the use of novel, fast-response circuitry, thereby enabling detection of cracks ranging in size down to microcracks in brittle or ductile materials which are subjected to a load.

SUMMARY OF THE INVENTION

It is, therefore, an object of the present invention to provide new and improved methods and apparatus for detecting and measuring electrical waves having a very low amplitude, short duration and fast rise time, which waves represent the stress waves propagating from a crack in a ductile or brittle workpiece, when said workpiece is subjected to a load.

To attain this and other objects, the present invention provides a high-frequency stress wave sensor mounted either directly to the workpiece being processed, or remote therefrom on the base supporting the workpiece, to detect stress waves propagating in the workpiece. The detected waves, which comprise previously undetectable low amplitude, short duration, and fast rise time pulses, are first converted into an electrical signal by the sensor and then amplified and filtered in a bandpass filter. The filter has a pass-band which eliminates any noise signals which may be generated by other components located in proximity to the apparatus, thereby passing only stress waves generated by the crack in the workpiece. The amplified stress waves are next processed in a unique peak-to-peak detector which has an increased response and decreased tracking error with respect to prior art detectors to accurately determine the magnitude of the waves. Lastly, a processing circuit generates an output signal indicative of a detected crack when the magnitude of the electrical output exceeds a predetermined system noise level.

DETAILED DESCRIPTION

Figure 1:
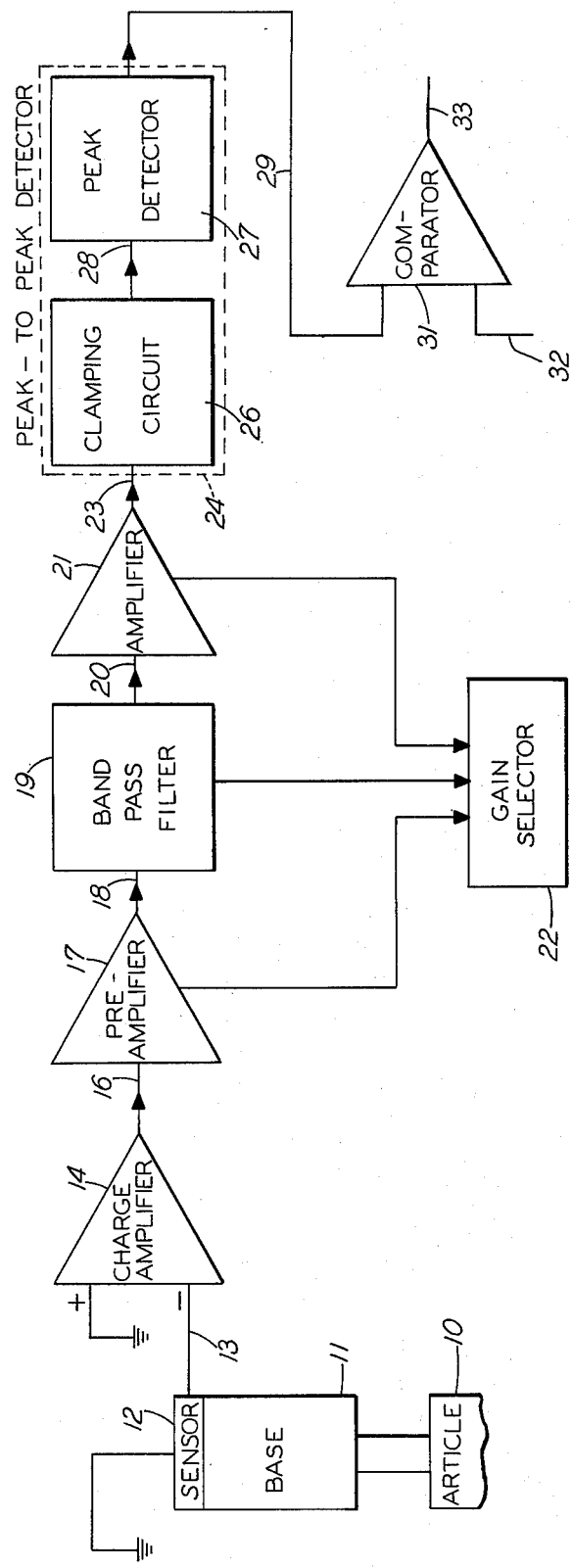
FIG. 1 is a simplified block diagram of a crack detection system according to the invention.

At the present time, a qualitative explanation of the processes involved in the fracturing of brittle materials is not available. Griffith's theory of microcracks, developed some 50 years ago, was the first attempt to characterize such processes. However, since these processes are still not fully understood, the Griffith concept, or a modification of it, is still used today.

A "fracture" may be defined as the separation of a body into two or more parts, sometimes called "complete cracking." The nature of the fracture differs with the material used and is often affected by the type of stress applied; the geometric features of the sample; and conditions of temperature and strain rate. The different types of fractures which are produced in brittle materials, for example, under alternating mechanical stress or at high temperatures, arise from differences in the modes of crack nucleation and propagation, which differences vary for each of these conditions. Brittle fracture always occurs when there is rapid propagation of the crack, after essentially no plastic deformation of the workpiece. In other words, it occurs, often at umpredictable levels of stress, whenever there is a sudden propagation of a crack in the workpiece. Amorphous materials, such as glass and glassy polymers, are completely brittle; however, in crystalline material some plastic deformation always precedes brittle fracture.

The first explanation given for the discrepancy between the theoretical and actual fracture strength in completely brittle materials was, as previously mentioned, offered by Griffith. Griffith assumed that in a brittle material there are many fine elliptical cracks, and that at the tip of such cracks there is a strong concentration of stress. The highest stress, at the tip of such an elliptical cavity, can be expressed by the equation $$\sigma_m \cong 2\sigma(c/\rho)^{1/2} \tag{1}$$

where
$\sigma_m$ = maximum stress at the tip of the crack;
$c$ = half the length of an interior crack, or the length of a surface crack;
$\rho$ = the radius of curvature at the end of the major axis; and
$\sigma$ = the applied tensile stress, normal to the crack.

With such a stress concentration, the theoretical cohesive strength can be attained at this localized area provided that the body of the material is under a fairly low applied tensile stress.

When a crack begins propagating through the workpiece, elastic energy is released. However, a certain amount of energy is gained as surface energy, due to the creation of new crack surface area.

The Elastic Strain Energy released by the spreading of a crack in a thin plate is given by the equation $$U_E = -(\pi c^2 \sigma^2)/E \tag{2}$$

and the surface energy gained by the creation of the crack is given by the equation $$U_S = 4c\gamma \tag{3}$$

where
$E$ = the elastic modulus;
$\gamma$ = the specific surface energy;
$c$ = half the length of an interior crack, or the length of a surface crack; and
$\sigma$ = the applied tensile stress, normal to the crack.

According to Griffith, such a crack will propagate and produce brittle failure when an incremental increase in its length does not change the net energy of the system.

That is, when $$\frac{\delta U}{\delta c} = \frac{\delta(U_E + U_S)}{\delta c} = 0 \tag{4}$$

or $$\sigma = \sqrt{\frac{2\gamma E}{\pi c}} \tag{5}$$

The foregoing analysis applies to a crack in a thin plate under plane stress. In equation 4, the stress necessary to cause brittle fracture varies inversely with the length of existing cracks. Hence, the tensile strength of a completely brittle material is determined by the length of the largest crack existing prior to loading. For a plate which is thick compared to the length of the crack (plane strain) the Griffith Equation may be stated as:

$$\sigma = \sqrt{\frac{2E\gamma}{(1-\nu^2)\pi c}} \tag{6}$$

where
$\nu$ = Poisson's Ratio.

The simplification introduced by considering only the two-dimensional case does not introduce a large error. It has been proved that Griffith's theory satisfactorily predicts the fracture strength of a completely brittle material such as glass. In glass, reasonable values of crack length of about $1\mu$ are calculated from equation 5.

Now, stress wave emissions may be defined as the elastic waves which are propagated in a structure as a result of an applied stress. These emissions have been associated with deformation processes such as dislocation motion, dislocation pile-up breakaway, and micro- and macro-cracking. When the conditions set forth in Griffith's equation are satisfied and a crack begins to propagate through a truly brittle material, the stress concentration due to the elongating crack steadily increases, and the released elastic energy exceeds the surface energy by increasing amounts, so that the fracture process accelerates and reaches the very high speeds at which an elastic field can rearrange itself.

As may be expected, the propagated stress wave suffers losses due to dispersion and reflection. Interactions between the direct path wave and reflected components thereof further complicate analysis. However, experimental evidence exists to justify the use of the two-dimensional wave equation to explain the stress waves which are emitted during the fracture of brittle materials. The final wave shape, therefore, may safely be used for the purposes of explanation, however, it should be borne in mind that this is an approximation and that it is not an exact reproduction of the shape of the original energy pulse transmitted.

These highly distorted stress waves, when detected by a piezoelectric transducer, can be thought of as amplitude modulated signals. First, assume an elastic stress-strain relation of the type given by the equation $$\sigma = E \, (\delta u/\delta x) \quad (7)$$

where E is an elastic constant. This equation enables Newton's Law to be written as a wave equation, as follows:

$$\frac{\delta^2 u}{\delta x^2} = \frac{1}{v^2} \frac{\delta^2 u}{\delta t^2} \quad (8)$$

where $$v = \sqrt{\frac{E}{\rho}} \quad (9)$$

If $y = vt$, equation 9 becomes $$\frac{\delta^2 u}{\delta x^2} = \frac{\delta^2 u}{\delta y^2} \quad (10)$$

Since $x$ and $y$ have equal status in this equation, any function of the variable $(x + y)$ is a solution to the equation. Similarly, any function of $(x - y)$ is also a solution to the equation. Therefore, the solution of equation 10 can be written as $$u(x,y) = g_1 \, (x + y) + g_2 \, (x - y) \quad (11)$$

where $u(x,y)$ represents two plane, harmonic waves traveling in opposite directions through the workpiece.

Once a brittle crack grows beyond its Griffith length, equation 9 cannot be satisfied. The Kinetic Energy cannot increase faster than the rate of which energy is supplied from an external source, and this, consequently, sets an upper limit to the speed of propagation of an elastic crack.

The crack velocity, therefore, is given by the equation $$v = Bv_o \, (1[C_G/C]) \quad (12)$$

where $B =$ a constant ($\approx 0.38$);
$C_G =$ the length of a Griffith crack, as evaluated by equation 1; and
$C =$ the actual crack length.

When C is large compared with $C_G$, equation 12 approaches the limiting value $Bv_o$.

Referring now to FIG. 1, an article 10 to be processed is mounted on a base 11, which may be, for example, the base of a thermocompression bonder or similar device. A piezoelectric sensor 12 is mounted to the base 11. In order for sensor 12 to detect waves propagating in base 11, it is preferable that base 11 be comprised of material having a bulk sonic velocity which closely corresponds to the velocity of sound in the material of article 10. The sensor 12, of course, may also be mounted directly to article 10, but it is clearly preferable to permanently mount sensor 12 to the base 11, as shown, since less handling steps will result, resulting in faster article processing time.

The signals which are detected by sensor 12 comprise waves which are: (a) generated by other electrical components in proximity to the system of FIG. 1, but not shown; (b) generated in article 10, base 11, or sensor 12 due to nontransient factors such as temperature and strain variations; and (c) stress waves, comprising bulk and surface waves, propagating from a crack in article 10 while the article is being subjected to a load. The latter signals, when generated by a microcrack propagating in a brittle material, comprise low amplitude, short duration, and fast rise time pulses which, as previously discussed, have heretofore been hidden in system noise and, therefore, have never been detected.

Whenever crack propagation occurs, energy is released in the form of a stress wave, which wave, in turn, excites sensor 12. Depending on wave damping at the interfaces, the traveling mechanical stress impulse will cause sensor 12 to provide an output voltage change which is almost proportional to the amplitude of the impulse. Because of the low amplitude of the stress wave pulses, good transmission of the mechanical wave or amplification of the sensor's output voltage is necessary.

To obtain optimum performance from a piezoelectric sensor, the circuit to which it is connected must have certain characteristics which are dictated by the nature of the sensor. For discussion purposes, it is convenient to divide piezoelectric sensors into two broad categories, i.e., non-resonant and resonant devices. Non-resonant devices are so named because they are designed to operate well below their natural resonance and over a relatively large frequency range, usually several octaves. Resonant devices, on the other hand, are designed to operate at a single frequency, that is, the mechanical resonant frequency of the device and over a band of frequencies which is usually less than one octave, which band includes the resonant frequency of the device.

Sensors comprised of Barium Titanate and Lead Zirconate Titanate have been used in the resonance mode. Also, Lead Metaniobate sensors have been employed where relatively high sensitivity, high working temperatures, and freedom from electrical ringing are desired. All three of the above types of sensors have been employed satisfactorily in the illustrative embodiment of the invention.

Figure 2:
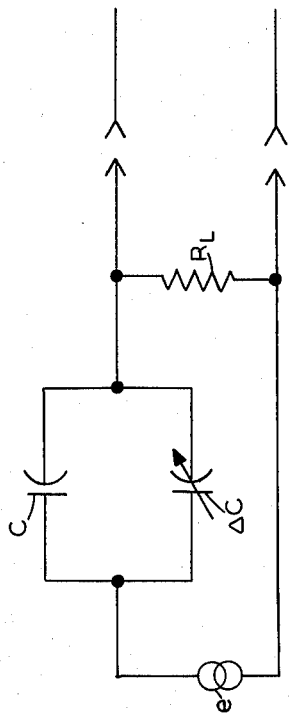
FIG. 2 is the equivalent circuit of a mechanically driven transducer of the type which may be used in the system of FIG. 1.

The equivalent circuit of a typical piezoelectric transducer is shown in FIG. 2. The change in capacitance of the equivalent sensor capacitance, $C_e'$, is the most important variable for the detection of signals. This change in capacitance, for a disc-shaped transducer, can be calculated as follows:

$$\Delta C_e' = K \, (d^2/T) \quad (13)$$

where $\Delta C_e' =$ the change of transducer's capacitance in pF;
$K =$ the multiplier dependent on the sensitivity of the transducer;
$d =$ the diameter of the disc in inches; and
$T =$ the thickness of the disc in inches.

As the capacitance of the transducer varies, the charge stored thereon also varies, according to the equation $$\Delta q = -\Delta C_e' e \qquad (14)$$

As shown in FIG. 1, sensor 12 is connected to the inverting input 13 of operational charge amplifier 14, said charge amplifier generating an output voltage on a lead 16 which reflects any change of charge, $\Delta q$, occurring in sensor 12. The output of amplifier 14 on lead 16 is further amplified in a low-noise preamplifier 17. Preamplifier 17, however, should advantageously be of a design such that it has a slewing rate of at least a $100v/\mu$ sec., since an amplifier having a lower slewing rate would substantially reduce the circuit response to pulses of short duration and fast rise time.

The output from the preamplifier is transmitted over a lead 18 to a band-pass filter 19 which has a pass-band that falls at least partially within the natural frequency of sensor 12, but which falls without the range of noise frequencies generated by other components in proximity to the system.

The output of band-pass filter 19 on a lead 20 is further amplified by an amplifier 21, which also advantageously has at least a $100v/\mu$ sec. slewing rate. A gain selector 22 permits the gain of amplifiers 17 and 21 to be adjusted, as well as any amplifiers which may be used in band-pass filter 19, as is discussed hereinafter with reference to FIG. 5. Gain selector 22 may comprise a separate potentiometer in each amplifier, but preferably comprises one potentiometer for gain adjustment of preamplifier 17 and a seperate potentiometer for common gain adjustment of amplifier 21, and any amplifiers which may be used in band-pass filter 19. In the latter event, the potentiometer will proportionately change the amplification of each of the connected circuits. The gain adjustment needed is experimentally determined beforehand, the amount of gain being dependent on the nature of the article being processed, and the reflection and attenuation of the stress waves emitted from article 10. It has been found that as the material in article 10 becomes more brittle, less amplifier gain is needed to detect and measure the stress waves emitted therefrom.

Figure 6:
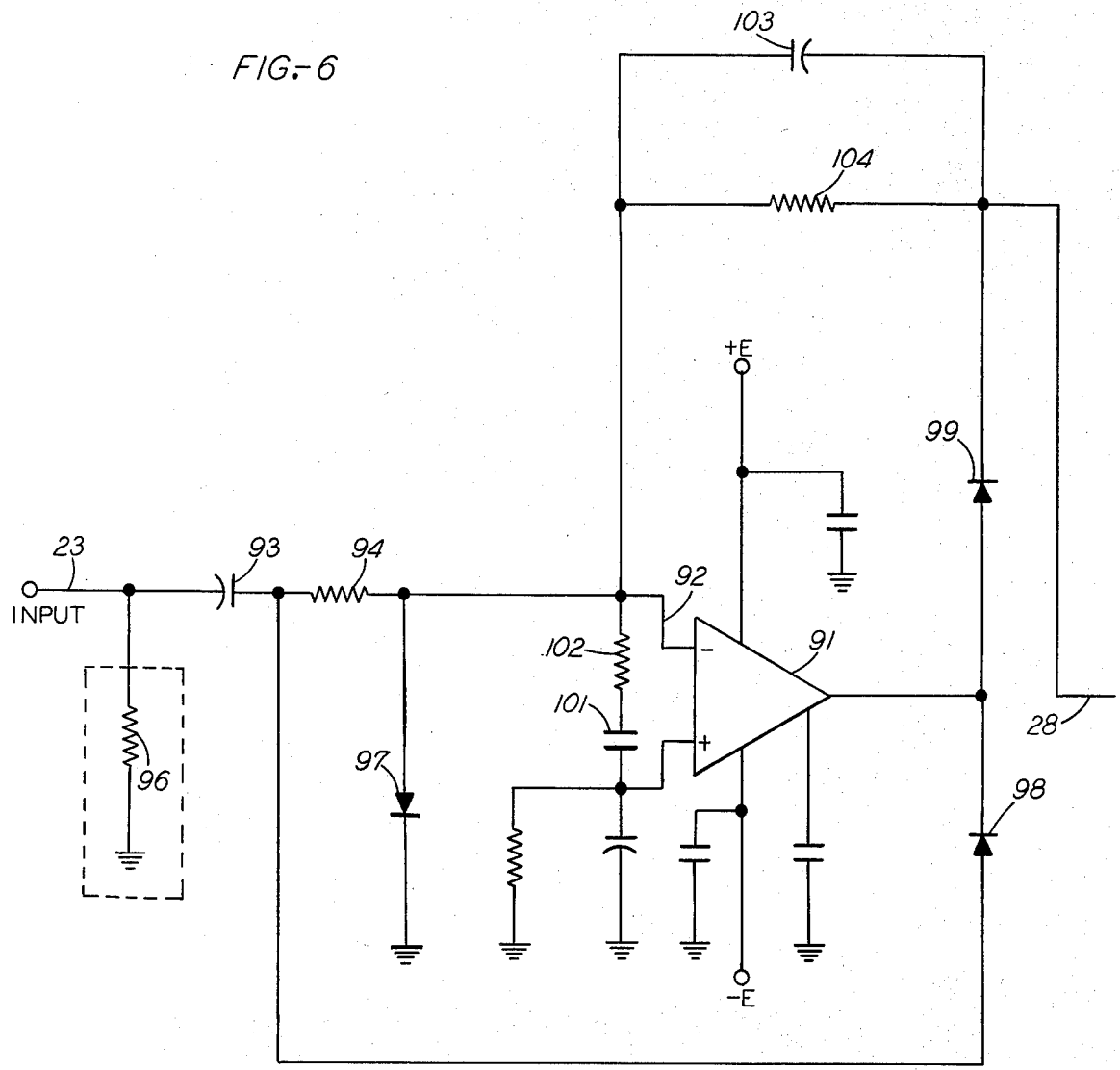
FIG. 6 is the circuit diagram of a clamping circuit for use in a novel peak-to-peak detector.
Figure 7:
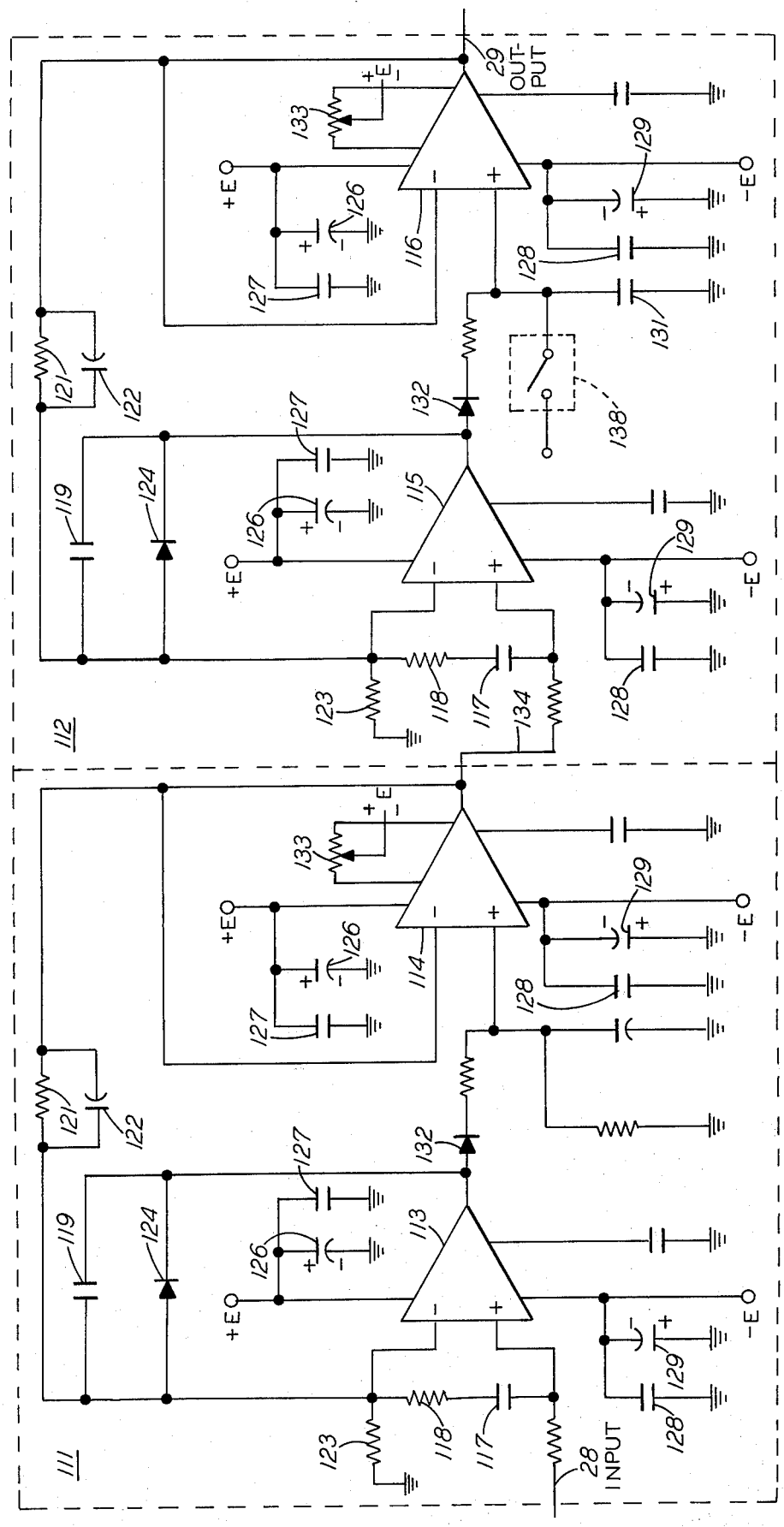
FIG. 7 is a circuit diagram of a peak detector and a peak-stretch circuit for use in the novel peak-to-peak detector of FIG. 6.

The amplified and filtered output from amplifier 21 on a lead 23 is transmitted to a peak-to-peak detector 24 which is capable of measuring short duration, fast rise time pulses. In the preferred embodiment of the invention, a novel peak-to-peak detector 24, comprising a precision clamping circuit 26 and a peak detector 27, as discussed hereinafter with reference to FIGS. 6 and 7, is employed. As will be more fully explained hereinbelow, the clamping circuit 26 references the input signal on lead 23 to a predetermined d.c. voltage level, preferably 0 volts d.c. The referenced signal is transmitted on a lead 28 to peak detector 27 where the magnitude of the signal is determined with respect to the predetermined d.c. voltage level. An indication of the determined magnitude is transmitted over a lead 29 to a comparator circuit 31 which compares the magnitude of the signal on lead 29 with a signal which is proportional to the system noise level, as present on a lead 32. When the magnitude of the referenced signal on lead 29 exceeds the system noise level, an output signal indicating a detected crack is provided on lead 33 to some suitable audible or visual indicating device, not shown.

Figure 3:
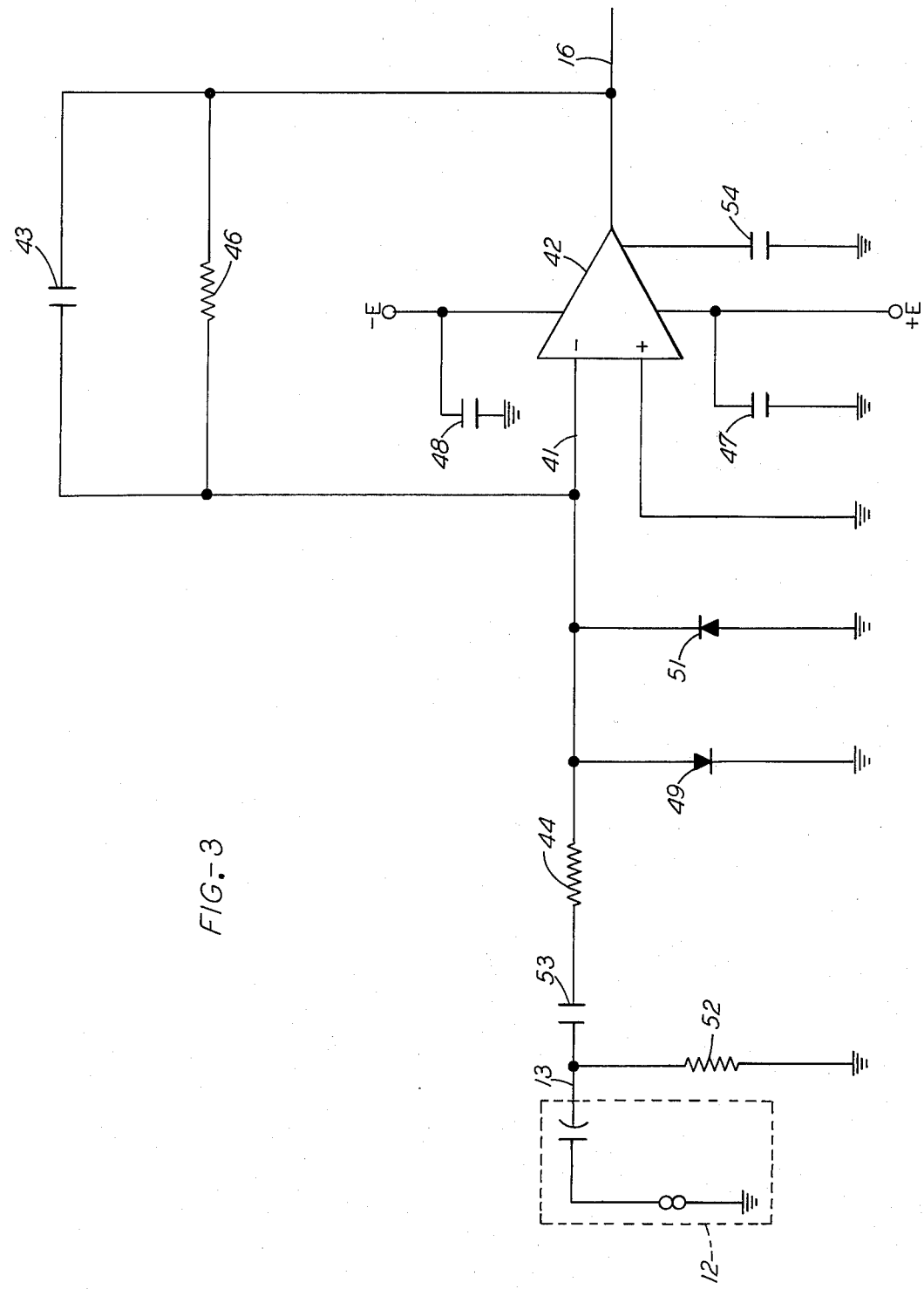
FIG. 3 is the circuit diagram of a novel charge amplifier which may advantageously be used in the system of FIG. 1.

Referring now to FIG. 3, the effect of the sensor's high output impedance is overcome by using an FET operational amplifier 42 having an extremely high input impedance, low bias current, and wide bandwidth. When sensor 12 is connected to the inverting input 41 of operational amplifier 42, as shown in FIG. 3, the incremental charge given by equation 14, above, flows into a feedback capacitor 43. The resultant change in charge on capacitor 43 generates an amplifier output voltage Vo given by the equation $$V_o \cong - \frac{\Delta C_e}{C_f} e \qquad (15)$$

where $C_f$ = the value of the feedback capacitor.

The frequency response of charge amplifier 42 advantageously extends from 1Hz to 10MHz ($\pm 3dB$). A resistor 44, which is connected in series between sensor 12 and inverting input 41, isolates the capacitive source from the feedback loop in the megahertz region and helps to reduce overshoot or noise. At low frequencies the response of amplifier 42 is $-3dB$ at the frequency at which the reactance of capacitor 43 is equal to the resistance of a feedback resistor 46. The maximum permissible value of resistor 46 is determined by the allowable output offset and the input current of the amplifier at the highest operating temperature.

Because of the very low input current to the FET-input amplifier, a very high value of feedback resistance 46 can be used to supply the d.c. bias current, which results in a low noise level of about $100\mu V$ RMS over a 10Hz to 1MHz bandwidth, when the amplifier is connected to a 2000pF source capacitor.

As shown in FIG. 3, a pair of capacitors 47 and 48 are connected to amplifier 42 and are connected in series across a source of power for the amplifier. A pair of diodes 49 and 51, connected in parallel but oppositely poled, are connected between the inverting input 41 of amplifier 42 and ground, to protect amplifier 42 from any high-voltage surges which may occur in sensor 12 due to abrupt temperature or strain variations. A resistor 52, connected between input lead 13 and ground, and a capacitor 53, connected between sensor 12 and input resistor 44, form a bleed network, heretofore never used in prior art charge amplifiers, for passing only transient waveforms from sensor 12 to amplifier 42. The bleed network, therefore, prevents steady state voltages, e.g., resulting from heating and expansion of sensor 12, from affecting the charge amplifier operation. A capacitor 54, connected between amplifier 42 and ground, provides a known form of bandwidth control.

The output of charge amplifier 14 is further amplified in a low-noise preamplifier 17.

Although operational amplifiers are generally designed to amplify d.c. signals, they have rather broad frequency response and are consequently quite useful for strictly a.c. signals. The feedback network used with an operational amplifier can be tailored for exactly the desired pass-band by various known methods of RC compensation.

Figure 4:
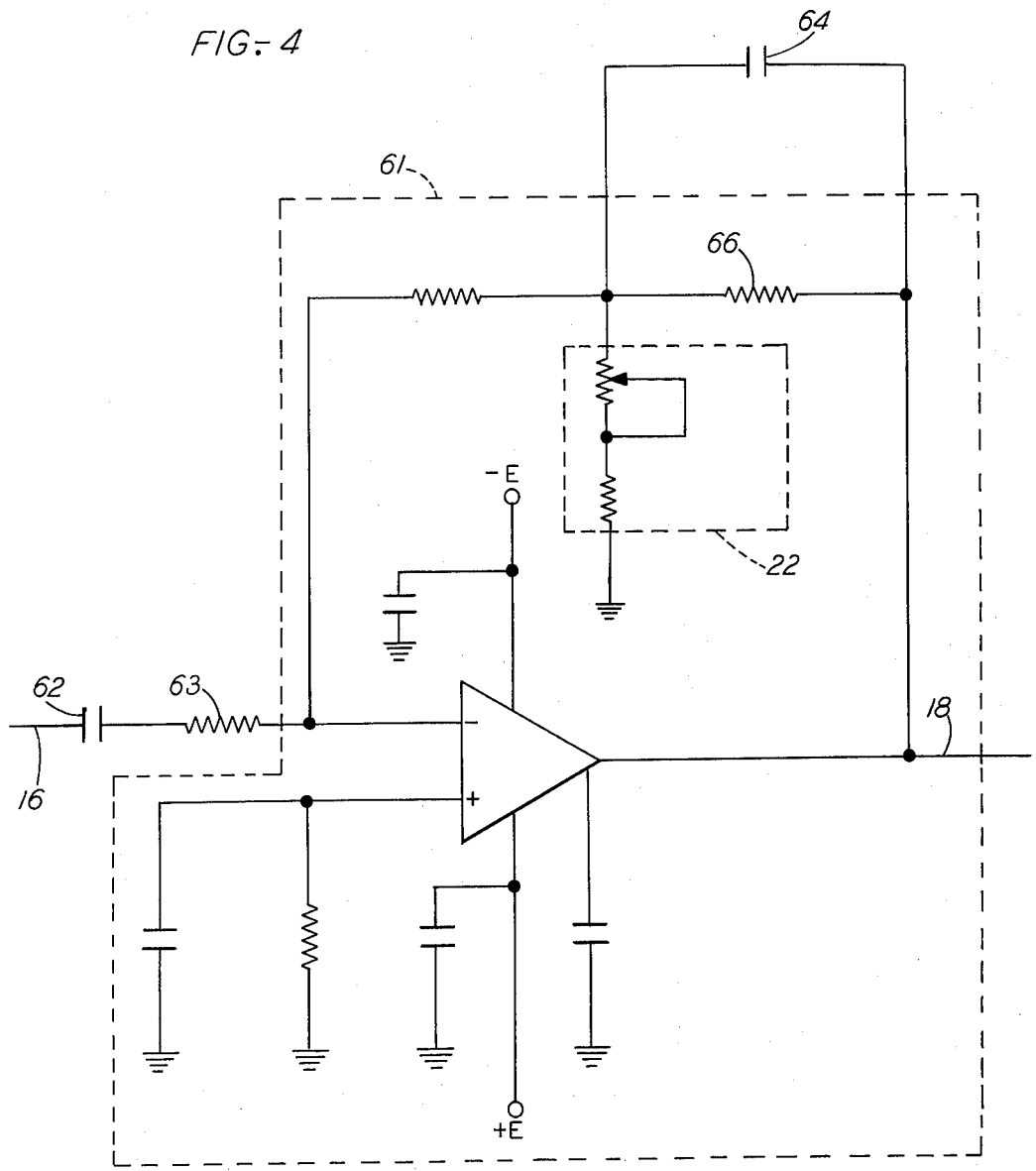
FIG. 4 is a circuit diagram of a low-noise amplifier for use with the system of FIG. 1.

A very simple and stable prior art amplifier configuration 61 is shown in FIG. 4. The prior art amplifier has been modified, according to the invention by the addition of a capacitor 62 and a resistor 63 in series with the input lead 16 to limit the low frequency bandwidth and thereby reduce noise. Capacitor 62 blocks the d.c. component of the input signal and, together with the resistor 63, sets the low frequency 3dB response point for the overall amplifier. Amplifier 61 has been further modified to reduce noise by connecting a capacitor 64 across a feedback resistor 66, capacitor 64 thereby limiting the high frequency bandwidth of amplifier 61. The preamplifier's gain should be variable, as mentioned previously, since the capacitance C of the equivalent circuit of sersor 12 used in equation 13 is only an approximation.

With reference to the filter 19 shown in FIG. 1, the desired band-pass characteristic can be achieved by using a low-pass and high-pass Butterworth filter section in cascade. However, the preferred circuit employs the novel active filter stage 71 shown in FIG. 5. This filter stage comprises an operational amplifier 70 which includes a Twin-T network, comprising resistors 72, 73 and 74 and capacitors 76, 77 and 78, in the feedback loop. Filter stage 71 not only provides the desired passband but also provides additional amplification of the signals passing therethrough. The pass-band of the filter stage is determined by the values of resistors 72–74 and capacitors 76–78 in accordance with well-known principals. Since the pass-band is changed when the values of resistors 72–74 are simultaneously varied, it is convenient to use resistors which are ganged on a single shaft for adjusting the filter stage 71 to a desired passband.

Figure 5:
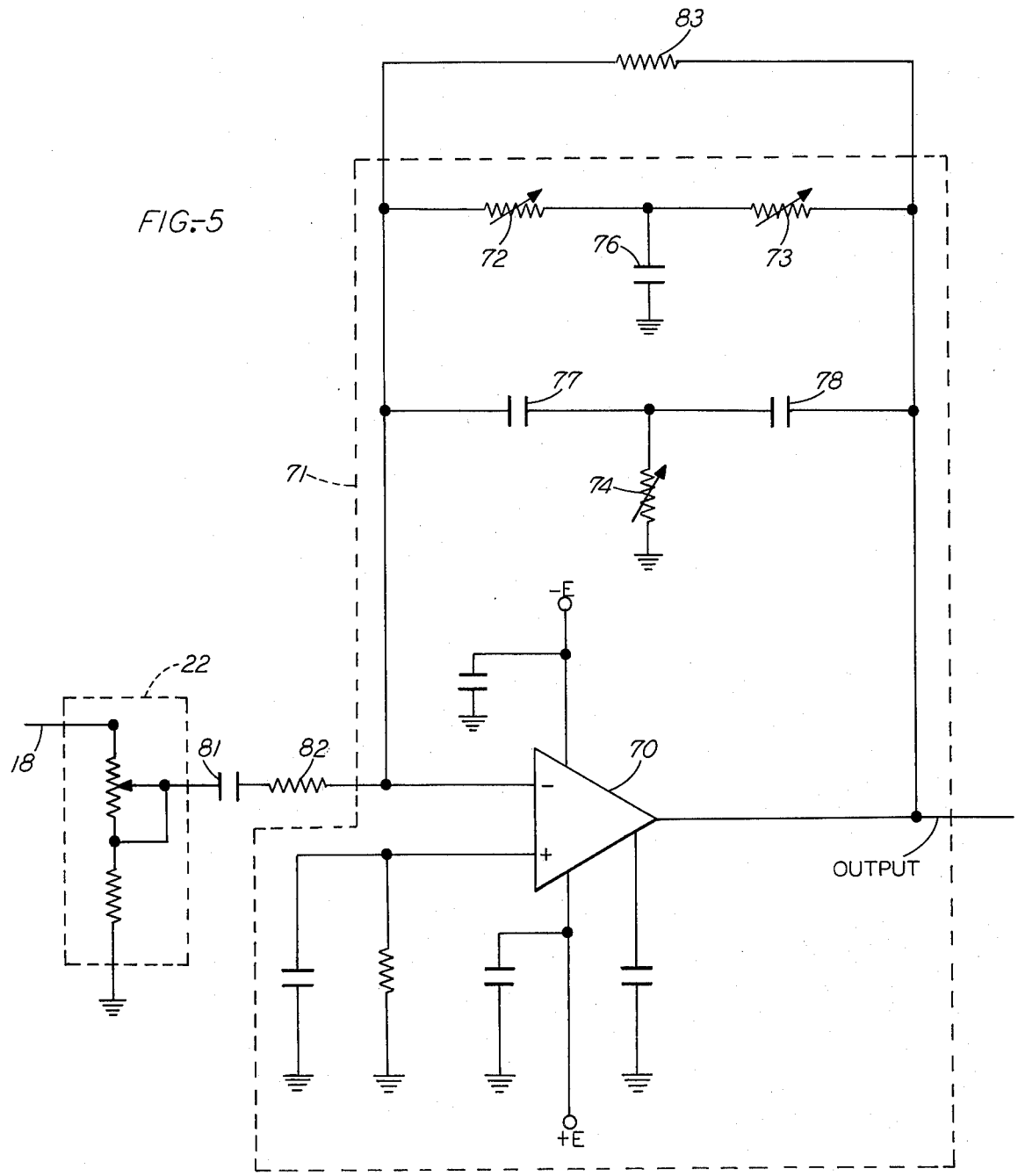
FIG. 5 is the circuit diagram of a Twin-T filter stage which may advantageously be used in the system of FIG. 1.

The Twin-T feedback network, however, causes a large amount of "ripple" over the wide frequency spectrum, e.g., from 0.3MHz to 1.2MHz, which is passed by the notch filter of FIG. 5. A capacitor 81 and a resistor 82, connected in series with the input lead 18 to filter stage 71, smoothes the ripple in the filter which is caused by the feedback network. A resistor 83 is connected across the feedback network to limit the depth of the notch provided by filter stage 71, thus providing a better signal-to-noise ratio.

Although only one stage is shown for band-pass filter 19, a plurality of similar stages can be serially connected, as desired, each stage providing an additional second order wave to further sharpen the notch response. In the preferred embodiment of the invention, three such stages are serially connected to provide a sixth order band-pass filter.

The conventional implementation of a peak-to-peak detector comprises: (a) a positive peak detector and a negative peak detector for respectively measuring the magnitude of the positive peak and the negative peak of an input waveform, with respect to a d.c. reference voltage; and (b) a circuit to sum the values so produced to arrive at an indication of the overall magnitude of the input waveform. The problems associated with prior art designs of this type are response time and large signal tracking errors. By utilizing the novel peak-to-peak detector shown in FIGS. 6 and 7, the response time is improved, since fewer components are used. Further, the use of only one peak detector keeps input signal tracking errors at a minimum.

A function that must frequently be accomplished with a periodic waveform is the establishment of the recurrent positive or negative extremity at some constant reference level $V_R$. Since, in the steady state, circuits used to perform this function restrain the extremity of the waveform from going beyond the reference level $V_R$, the circuit is usually referred to as a "clamping circuit." Generally, whenever a circuit point becomes connected through a low impedance (for example, a conducting precision diode) to some reference voltage $V_R$, then that point has been clamped to $V_R$, since the voltage will not be able to depart appreciably from $V_R$. The novel precision clamping circuit of FIG. 6 uses a conventional operational amplifier 91, altered as hereinafter described.

The output of amplifier 21 in FIG. 1 is connected to clamping circuit 26 over lead 23, more particularly to the inverting input of operational amplifier 91. Connected serially in input lead 23 is a capacitor 93 and a resistor 94 which form a clamping network that shifts the incoming wave to the reference level. A resistor 96 is connected between lead 23 and ground, ahead of the clamping network, to reflect any noise components back into the output of amplifier 21. A diode 97 and a pair of diodes 98 and 99, respectively connected to the input and output of amplifier 91, provide amplifier protection to prevent saturation or latching.

The novel means whereby the bandwidth of the clamping circuit 91 is extended comprises a serially connected capacitor 101 and a resistor 102, connected across the inverting and non-inverting inputs of amplifier 91. The novel means for substantially reducing "overshoot" in the clamping circuit comprises connecting a parallel-connected capacitor 103 and a resistor 104 in the feedback path of amplifier 91.

Referring to FIG. 7, the schematic circuit of a novel peak detector according to the invention is shown. This detector is advantageously used for peak detector 27 in FIG. 1. The detector includes a peak detecting section 111 which, in combination with a peak stretching section 112, responds to input pulses greater than 1MHz while nevertheless maintaining a low droop rate. High speeds are achieved by the use of a plurality of high slew-rate operational amplifiers 113–114 and 115–116 serially connected to each other in sections 111 and 112, respectively.

The output of clamping circuit 27 in FIG. 6 is connected to the non-inverting input of amplifier 113 over lead 28. The output of amplifiers 113, 114 and 115 are respectively connected to the non-inverting inputs of amplifiers 114, 115 and 116. A network comprising a capacitor 117 serially connected with a resistor 118 is connected across the inverting and non-inverting inputs of amplifiers 113 and 115 to extend the bandwidth of sections 111 and 112, respectively.

The final amplifiers 114 and 116 in sections 111 and 112, respectively, each include a feedback network comprising a capacitor 119 connected in series with the parallel combination of a resistor 121 and a capacitor 122. A resistor 123 is connected between each of the inverting inputs of amplifiers 113 and 115 and ground. The resistors 121 and 123, in each of the sections 111 and 112, in conjunction with capacitors 119 and 122, provide gain control for minimal "overshoot" characteristics, the latter capacitors helping to reduce overshoot and uncertainty since a constant level of minimal overshoot always remains and is determinable.

A diode 124 is connected across the inverting input and the output of amplifiers 113 and 115 and a diode 132 is connected between amplifiers 113–114 and 115–116, to provide protection for the amplifiers. To reduce noise, power supply coupling capacitors 126–129 are connected in parallel between the power supply terminals and ground in each of amplifiers 113–116. As mentioned previously, section 111 detects the peak of the input wave on lead 28 and section 112 stretches the wave peaks, effectively preventing discharge of a capacitor by expanding the peaks. A capacitor 131 connected between the non-inverting input of amplifier 116 and ground provides the peak stretching capability of section 112.

Figure 8:
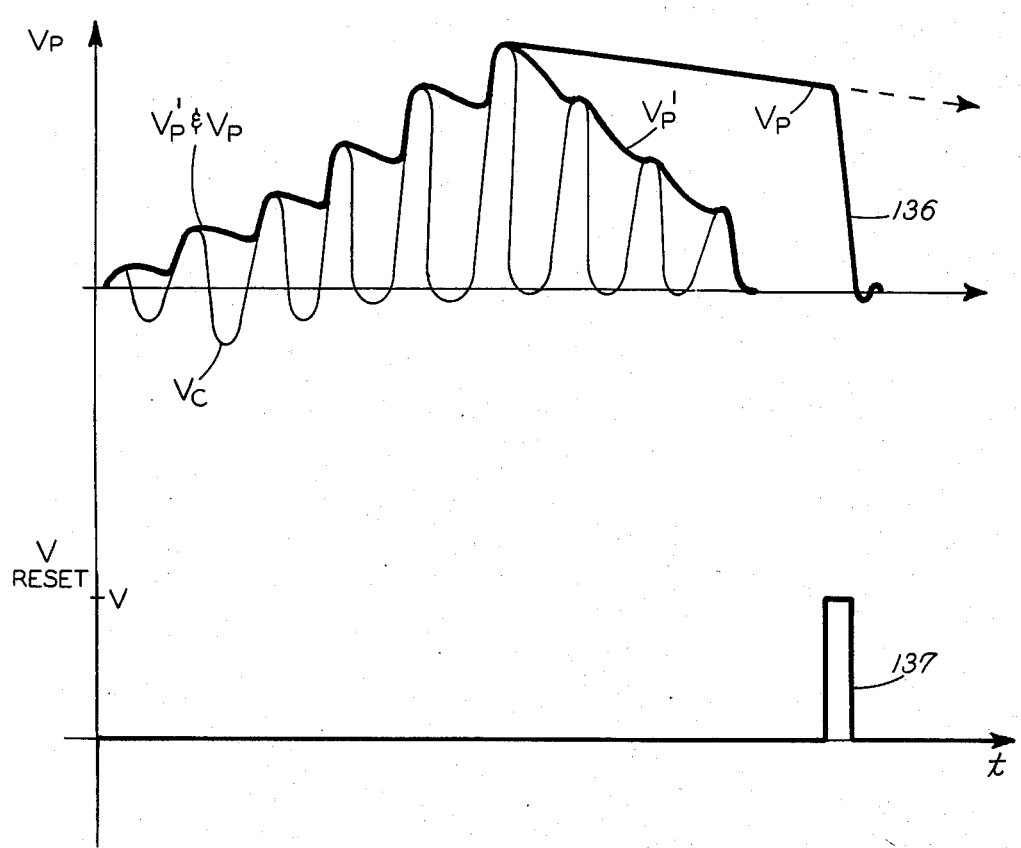
FIG. 8 depicts the input and output waveforms of both the clamping circuit and the peak detector shown in FIGS. 6 and 7, respectively.

Referring to FIG. 8, a typical set of waveforms is shown to aid in understanding the function of sections 111 and 112 of FIG. 7. Waveform Vc represents an input wave to peak detection section 111 from clamping circuit 26 via lead 28. Waveform $Vp'$ represents the output wave from peak detection section 111, as found on lead 134 of FIG. 7, which wave also represents the input to pulse stretching section 112. Waveform $Vp$ represents the output of pulse stretching section 112 on lead 29 and depicts the stretching of the $Vp'$ pulses as the peaks of waveform Vc first increase and then decrease in value. The sharp decrease 136 of waveform $Vp$ results from a reset pulse 137, produced by a commercially available solid state switch 138 and its associated circuitry (not shown), which reset pulse is introduced into pulse stretching section 112 once the maximum peak has been measured.

The preferred embodiment of the present invention, as described above, is capable of operating at a signal-to-noise ratio of at least 200:1. As shown in FIG. 1, a decision comparator 31 is inserted into the system to receive the output signal of peak-to-peak detector 24 in order to decide if the signal generated therein exceeds an empirically preset noise threshold. The threshold to be used is a function of the electrical noise generated by the apparatus on which the present system is used, and by the large spikes typically carried by the a.c. line in a factory environment. Thresholds of 1.0 volts can be a typical value but the value is mainly determined from the surrounding conditions of the system.

Decision making comparators can also be used to further analyze the degree of crack damage. That is, in processing electronic substrates, "corner chip-offs" or glass substrate "flop-offs" can be detected and distinguished from "complete substrate cracks."

There exists a relationship between the amount of crack propagation and the output voltage of the present system. Two comparators can thus be used, one corresponding to "corner chip-offs," possible with a system threshold voltage of between 1.5V and 2.5V, and one for "complete cracks" with a system threshold voltage possibly above 2.5V. This approach may be used as a screening and grouping procedure for further processing. The information generated from a particular comparator can be audibly or visually displayed, by means of any suitable indication circuit.

The system, according to the invention, uses economically produced, low-noise, reliable wideband circuits which, when interconnected with a 3-stage Twin-T active filter, as described above, enables the detection of signals in a narrow 100KHz frequency range located, for example, between 0.3KHz and 1MHz. The frequency range chosen depends on the material being tested and on the signals generated by external components in proximity to the system. The present invention is also capable of detecting high frequency stress waves emitted through irregular surfaces connected only with integrated circuit pin supports. With an open output and the sensor connected to the input the present system produces noise values equal to only approximately ½mv, when using a minimal overall gain of approximately 150, and approximately 20mv when using a maximum overall gain of approximately 15,000.

The present invention can be used not only to detect non-visual cracks as they are propagated, but in so doing eliminates the need for visual inspection of finished products for cracks. The system can be a very useful tool not only in the detection of cracks but also in the identification of problem areas causing cracks. As an example, if the present crack detector is used on a bonder and detects small cracks of "corner chip-offs," then it is time for calibration of the bonder since further degradation will cause substrate "complete cracks" (useless product). A crack in either one of two materials being bonded together may also be detected.

It is understood that the above-described arrangement of components, circuits and cooperation of elements are simply illustrative of the principles of the invention and many other modifications may be made without departing from the spirit and scope of the invention.

What I claim is:

1. A method for detecting and measuring stress waves propagating in the material of a workpiece while said material is being subjected to a load for detecting the presence of a defect such as a crack in said material, said stress waves including waves characterized by short duration and fast rise time, the method comprising the steps of:
   a. detecting the stress waves propagating in the material of a workpiece with a stress wave sensor to produce an electrical output representative of the detected stress waveforms, said output having at least one positive-going peak and at least one negative-going peak;
   b. amplifying the electrical output from the stress wave sensor;
   c. filtering the amplified electrical output through a filter having a pass-band falling outside the range of frequencies normally generated by components in proximity to the apparatus performing the present steps;
   d. referencing one of the at least two peaks of the amplified electrical output to a first predetermined d.c. voltage level;
   e. determining the magnitude of the referenced amplified electrical output by measuring the difference between the other peak of the referenced amplified electrical output and the predetermined d.c. voltage level; and
   f. generating an output signal indicative of a detected defect when the magnitude of the amplified electrical output exceeds a second predetermined value.

2. Apparatus for detecting and measuring stress waves propagating in the material of a workpiece while said material is being subjected to a load for detecting the presence of a defect such as a crack in said material, the apparatus comprising, in combination:
   a. a sensor for detecting stress waves propagating in the material of said workpiece to produce an electrical output representative of the detected waves;
   b. first signal processing means comprising:
      i. an amplifier for amplifying the electrical output from the sensor, said electrical output comprising waves characterized by both a very short duration and a very fast rise time; and
      ii. a band-pass filter connected to the output of said amplifier and having a pass-band which falls outside the range of frequencies normally generated by components in proximity to the apparatus;
   c. second signal processing means comprising:
      i. referencing means, connected to the output of said first signal processing means, for referencing each first amplitude extremity of the amplified and filtered electrical output from said first signal processing means to a first predetermined d-c voltage; and ii. a peak detector connected to the output of said referencing menas to provide an output signal indicative of the magnitude of each second amplitude extremity of the referenced amplified and filtered electrical output from said referencing means with respect to said first predetermined d-c voltage; and d. means connected to the output from said second signal processing means for generating an output signal to indicate the presence of a detected defect when the magnitude of the electrical output signal from said peak detector exceeds a second predetermined value.

3. Apparatus according to claim 2, wherein said first band-pass filter comprises:
an active Twin-T filter circuit having at least one stage, said stage comprising an operational amplifier and a feedback network connected across said operational amplifier; said stage further comprising:
a network connected to the input of said operational amplifier to smooth out the ripple normally present in the response characteristic of said stage; and
means, connected across said feedback network, to limit the depth of the notch in the response characteristic, thereby improving the signal-to-noise characteristics of said band-pass filter.

4. Apparatus according to claim 2, wherein said referencing means comprises a clamping circuit including:
an operational amplifier having an inverting input, a non-inverting input, and an output;
a clamping network connected to said inverting input; and
a feedback network connected between said amplifier output and said inverting input for substantially reducing overshoot.

5. Apparatus according to claim 2, wherein the peak detector comprises:
a peak detection section for detecting each peak in the referenced amplified electrical output with reference to said first predetermined d.c. voltage; and
a pulse stretching section for receiving the output from said peak detecting section to maintain the level of each detected peak with minimal decay, the output from said pulse stretching section being representative of the the input to said peak detecting section.

6. Apparatus according to claim 2, wherein said amplifier comprises a charge amplifier, comprising an input circuit and a feedback circuit, for amplifying said electrical output by accurately reflecting changes in the charge stored in said stress wave sensor, the input to said charge amplifier including a bleed network which permits only transient signals from said sensor to be amplified in said charge amplifier.

7. Apparatus according to claim 6, wherein said amplifier further includes means, connected to the input and feedback circuits thereof, for respectively limiting the low frequency and high frequency bandwidth of said amplifier, thereby providing reduced noise in said amplifier.

8. Apparatus according to claim 7, wherein said amplifier comprises a high slew-rate operational amplifier.

9. Apparatus according to claim 4, wherein said referencing means further comprises a network connected between said inverting and said non-inverting inputs to extend the bandwidth of said clamping circuit.

10. Apparatus according to claim 4, wherein said referencing means further comprises a terminator network connected to said inverting input to reflect any noise components present in the input wave back to the preceding circuit component.

11. Apparatus according to claim 5, wherein said peak detecting section comprises at least one peak detecting stage including:
an operational amplifier having an inverting and a non-inverting input, and
a network connected between said inverting and said non-inverting inputs to extend the bandwidth of said peak detecting section.

12. Apparatus according to claim 5, wherein said pulse stretching section comprises at least one pulse stretching stage including:
an operational amplifier having an inverting and a non-inverting input, and
a network connected between said inverting and said non-inverting input terminals to extend the bandwidth of said pulse stretching section.

13. Apparatus according to claim 11, wherein said peak detecting section further comprises means for providing a constant level of minimal overshoot in the tracking of the referenced amplified electrical output in said peak detecting section.

14. Apparatus according to claim 12, wherein said pulse stretching section further comprises means for providing a constant level of minimal overshoot in the tracking of the referenced amplified electrical output in said pulse stretching section.

15. Apparatus for detecting and measuring stress waves propagating in the material of a workpiece while said material is being subjected to a load for detecting the presence of a defect such as a crack in said material, the apparatus comprising, in combination:
a. a sensor for detecting stress waves propagating in the material of said workpiece to produce an electrical output representative of the detected waves, said output having at least one positive-going peak and at least one negative-going peak;
b. first signal processing means comprising:
i. an amplifier for amplifying the electrical output from the sensor, said electrical output comprising waves characterized by both short duration and fast rise time; and
ii. a band-pass filter having a pass-band which falls outside the range of frequencies normally generated by components in proximity to the apparatus;
c. second signal processing means comprising:
i. means, connected to the output of said first signal processing means for referencing one of the at least two peaks of the amplified electrical output to a first predetermined d.c. voltage; and
ii. a peak detector to provide an output indicative of the magnitude of the amplified electrical output by measuring the difference between the other one of said at least two peaks and said first predetermined d.c. voltage; and
d. means for generating an output signal to indicate the presence of a detected defect when the magnitude of the electrical output exceeds a second predetermined value.

* * * * *

UNITED STATES PATENT OFFICE
CERTIFICATE OF CORRECTION

Patent No. 3,924,456          Dated December 9, 1975

Inventor(s) Sotirios John Vahaviolos

It is certified that error appears in the above-identified patent and that said Letters Patent are hereby corrected as shown below:

In the title, "Methods" should read --Method--.

In the specification, column 3, lines 46-47, "umpredictable" should read --unpredictable--. Column 4, Equation 4, "$\delta$" should read --$\partial$-- throughout the equation. Column 5, line 19, Equation 7, "$\delta$" should read --$\partial$-- throughout the equation; line 25, Equation 8, "$\delta$" should read --$\partial$-- throughout the equation; line 35, Equation 10, "$\delta$" should read --$\partial$-- throughout the equation; line 56, "$\approx$" should read --$\simeq$--. Column 8, Equation 15, that part of the equation which reads "$\cong - \frac{\Delta C_e}{C_f}$" should read --$\simeq - \frac{\Delta C_e{}'}{C_f}$--.

In the claims, column 13, line 2, claim 2, "menas" should read --means--.

Signed and Sealed this second Day of March 1976

[SEAL]

Attest:

RUTH C. MASON
*Attesting Officer*

C. MARSHALL DANN
*Commissioner of Patents and Trademarks*